UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

WATERPROOFING-COATING COMPOSITION FOR CONCRETE, &c.

999,708. Specification of Letters Patent. Patented Aug. 1, 1911.

No Drawing. Application filed February 16, 1911. Serial No. 608,888.

*To all whom it may concern:*

Be it known that I, CARLETON ELLIS, a citizen of the United States, and a resident of Montclair, in the county of Essex and State of New Jersey, have invented certain new and useful Improvements in Waterproofing-Coating Compositions for Concrete, &c., of which the following is a specification.

This invention relates to a composition of matter adapted for use as a vehicle for painting concrete and cement structures of divers sorts and relates particularly to a composition containing rubber resin, all as more fully hereinafter described and claimed.

Concrete made from Portland cement is ordinarily rather porous and lacking in waterproof qualities; also it has a grayish brown tint as usually prepared which, for certain purposes is not desired. The cement used in the concrete contains a considerable amount of alkali in the form of free lime, or lime in loose combination; also potash or soda in basic form. In addition, bodies of a more or less water soluble nature are present and these compounds, under the action of moisture tend to migrate from the interior of the concrete mass and appear on the surface thereof as a white efflorescence known by the artisan as "saltpeter" or lime stains. These are very unsightly and often greatly injure the appearance of buildings, such as dwelling houses constructed of solid or monolithic concrete and stucco. Moreover, the surface of concrete often undergoes a slight disintegration, known as checking, which renders the surface unsightly, so for these and other reasons, concrete surfaces frequently need to be painted.

The basis of ordinary paint, linseed oil, is not adapted for use in the painting of concrete. Linseed oil, being a readily saponifiable oil, is affected by the alkalis of the cement and perishes rather rapidly. With the idea of overcoming these difficulties, proposals have been made to treat the surface of the concrete, prior to painting, with an acid, or neutralizing wash, such as aqueous solutions of hydrochloric and sulfuric acids, zinc sulfate, ammonium carbonate and the like. In addition to the time required to apply such a wash, the work has to be delayed in order to permit the water to dry out before the paint is applied and the surface of the cement, because of such drastic acid treatment, is oftentimes more or less disintegrated, the bonding of the cement is in a measure destroyed, especially at the surface, leading to scaling and checking. This action is enhanced by the action of frost in winter and may lead to a very great deterioration of the painted surface. Then too, there is always danger that alkalis from the interior of the cement mass may find their way to the surface of the mass and affect the paint coating by saponifying action; for the neutralizing action of the acid wash is only superficial at best, leaving the interior of the cement with its full quota of unneutralized alkali. For this and other reasons linseed oil has not found favor in the painting of concrete.

Solutions of ordinary varnish gums, such as Manila or kauri copal in turpentine and other solvents have also been suggested, but these also are saponifiable to a very considerable degree and are open in a large measure to the same objections noted in the case of linseed oil.

My invention has to do with paint vehicles which essentially are substantially free from binding materials affected by the alkalis of cement, and comprises the use of resins, or resinous materials extracted from rubber gums and in particular the rubber gum known as jelutong.

Different qualities of jelutong are known in the trade, according to the source from which they are derived, as Palembang, (Sumatra) Pontianak, (Borneo), Sarawak, and the like. Commercial jelutong is obtained by coagulating the latex derived from the jelutong tree. Commercial jelutong contains roughly about 70% water, and 30% solid material, the latter consisting of about one third rubber and two thirds resin, so that for about each pound of rubber recovered, about two pounds of resin are obtained. The resin has found but few uses, and has constituted a waste, or by-product of considerable magnitude.

The process of deresination as now practiced by the aid of solvents, leaves the resin in the form of a mass of white particles, or friable lumps, usually containing some moisture and the method of treatment for rendering this resin suitable as a basis for concrete paint vehicles, or oils, will shortly be described.

Jelutong resin, as for example, Pontianak, is practically unsaponifiable, as I have indicated in U. S. Letters Patent No. 900,687 of Oct. 6th, 1908. While the resin after melting, is similar in appearance to ordinary colophonium, it is widely different chemically and because of this, unfit for the many uses to which colophonium is adapted. Thus, because of its unsaponifiability, Pontianak rubber resin cannot be used, as is rosin, in the manufacture of soaps, etc.

Chute has called attention to the difficulty of utilizing Pontianak rubber resin, (*India Rubber World*, July 1st, 1909) and has given some data as to the properties of this resin. His data as to the solutions of this resin coincide to a considerable extent with my own observations, except that no mention has been made by Chute of the instability of many of the solutions of resin. When first prepared, clear solutions are readily obtained, as, for example, by melting one part of Pontianak rubber resin and thinning with two parts of petroleum naphtha. Such a clear solution is however, supersaturated and on keeping for a few weeks or months or even longer, separation of the less soluble portion occurs spontaneously and the former clear solution becomes largely a grayish paste, or solid mass. Most common solvents act in this way as the following tabulation indicates: For example, a clear liquid mixture made from equal parts of Pontianak resin and pine oil, on standing for a considerable period becomes solid; with one part resin and two parts pine oil, it is about one half solid; with one part resin and one part each of pine oil and solvent naphtha, nearly solid. Nearly solid products are produced on standing by mixing two parts of Pontianak resin with one part each of pine oil and heavy benzin, two parts of the resin to one part pine oil and two parts of heavy benzin, also two parts resin to two parts each of these solvents give like results. Light benzin, (varnish maker's benzin) with pine oil in varying proportions, acts in the same way. Equal parts of the resin and spirits of turpentine solidify as do mixtures composed of three and four parts of turpentine to two parts of resin. Mixtures of turpentine, with light and heavy benzin behave in a similar manner. Mixtures, of pine oil, solvent naphtha and heavy benzin are but little better as solvents. Good quality solvent naphtha alone, is somewhat better. However, two parts of the resin, with one and one-half, two and two and one-half parts of ordinary crude solvent naphtha solidify completely, three parts of solvent naphtha is nearly solid, while three and one-half and four parts of the solvent yield three-quarters solid and one-quarter liquid. Two parts resin to three parts varnish maker's benzin is two thirds solid, and about four parts of the benzin gives about one-half solid material. Benzol has better solvent properties. With two parts of Pontianak resin to four or five parts of benzol the solutions remain clear. Equal parts of resin and benzol, on the other hand become solid. Mixtures of solvent naphtha and varnish maker's benzin often have a similar solidifying action. Mixtures of benzol and benzin with the resin are somewhat unstable. Russian turpentine has better solvent properties than ordinary spirits of turpentine but in the course of time, solidification sets in with solutions of moderate concentration. Guayule resin is permanently soluble in the solutions mentioned and seems to exert some influence in maintaining the Pontianak resin in solution.

The foregoing mixtures, which segregate solid material do not dry properly, especially when exposed in moderately thick films. If a very thin film is allowed to dry, say on a glass plate it may become hard, but is usually cloudy, or "frosted." Thicker films usually behave differently as solidification or separation of the material held in solution in a supersaturated condition is very liable to occur, forming a pasty sticky mass which dries very slowly and apparently never attains any very great degree of hardness.

There is great uncertainty respecting the permanency of such solutions in storage. The solidification may occur in a few days or the solutions may retain their mobility and clarity for a long time to finally coagulate and become worthless as finish coating material. The various factors which enter into the phenomena of spontaneous coagulation have not as yet been fully determined by me and I content myself for the present simply with calling attention to these observations.

In the preparation of finish coatings, such as paint oils, varnishes and the like, concentrated solutions of resin are often required. For example, making rosin varnish known as the "gloss oil" type, five or six parts of ordinary rosin are used to four or five parts of benzin. With Pontianak rubber resin, ordinarily such concentrations would be impossible to secure.

In the manufacture of varnish from hard resins, it is quite customary to heat such resins to a temperature of 500 to 600 degrees F. in order to render them more suitable for combination with oils, etc. But in the case of Pontianak resin, it has been supposed that a temperature of 400 degrees could not be exceeded, owing to the formation of acetic acids and other supposedly injurious bodies. I have found however, that this is not the case, but that it is entirely feasible to heat Pontianak resin to a temperature of even 600 degrees, or higher, thereby producing a solution which is readily soluble in ordinary volatile thinners, customarily used in varnish manufacture. In order to obtain such a high degree of solubility, I find that by heating the resin for about an hour at about 600–620 degrees F. gives a loss in weight of about 20% and suffices to render the product readily soluble in thinning mediums, such as benzol benzin and the like. In fact, by such treatment it becomes possible to make a solution in say benzol for example, of just as high a concentration as that obtained in ordinary rosin gloss oil. This is a very important consideration, because a concentrated solution is ordinarily required in coating materials and the dilute mixtures obtained by the solutions of the raw Pontianak resin in volatile thinners do not give for many purposes the requisite degree of concentration. Another important advantage is that such concentrated solutions derived from the employment of resin heated to 600 degrees or thereabout as above indicated, is the very noticeable mobility of these solutions. Ordinary gloss oil, containing 50% or 60% of rosin is usually relatively thick and rather viscous, so that when worked out under the brush, considerable drag is experienced and brush marks often appear. In the present case, it is possible to secure relatively thin solutions of unusually high concentration, which work with very great freedom under the brush. While ordinary gloss oil is destroyed in a short time by the action of the sun and rain, the Pontianak resin, treated in this manner, shows an unusual degree of resistance to atmospheric influence.

Solutions of the resins, suitable as paint vehicles may be made in the following way:—125 lbs. of Pontianak resin is heated for one hour at about 600 degrees F., giving a loss of about 25 lbs. The molten resin is cooled to about 300 degrees F. and thinned with 90 or 100 lbs. of benzol. Or a mixture of equal parts of benzol and benzin may be used for thinning, likewise other common solvents, such as turpentine, wood turpentine, texene, solvent naphtha, toluol and the like may be employed, it being possible even with solvents, such as texene, which is not as powerful in its solvent properties as solvent naphtha or benzol, for example, to secure solutions of fairly high concentration. The solutions made in this way may, if desired, be incorporated with drying oils and driers, including, fish, linseed, china wood, corn, and soya bean oils. Also manganese and lead oleate and linoleate and guayule resin may be incorporated, the latter especially if a very high gloss is desired.

Instead of heating at 600 degrees for one hour, the resin may be heated at a somewhat lower temperature for a longer period, as for example, at 550 degrees F. for two hours or 500 degrees for four hours. If however, the resin is not heated above 400 degrees F. the desired degree of solubility is not secured, nor the desirable properties of mobility and free operation under the brush. The heat treatment may be somewhat shortened by blowing air through the resin, or even by treatment with superheated steam, or inert gases, which tend to accelerate the removal of the undesirable and insoluble constituents, or causes changes in these which brings about the desired properties above mentioned.

When run at a temperature of 600 degrees or higher, the resulting solution is somewhat dark in color, and this may be bleached, if desired, by filtration through fullers' earth or bone black, or by treatment with chemical bleaching agents, such as chlorin and its compounds having bleaching properties, sodium peroxid, ozone and the like.

Owing to the fact that at temperatures above 400 degrees deep seated changes take place in the resin, rendering it a compound seemingly having almost entirely different properties, it would be expected that organic acids would develop which would give the composition a marked saponification equivalent. I find however, that this is not the case, although if the material is heated at 500 degrees or 600 degrees F. with hydrated lime for a long period, a small quantity of the lime is taken up by the resin apparently, resulting in a product which is slightly harder than the unlimed resin. The changes which take place are, however, so far as can be judged, those of polymerization and depolymerization, so that the very desirable quality of unsaponifiability may be caused to remain substantially unchanged.

The treatment of the resin at high temperature may take place if desired at reduced atmospheric pressure, the temperature and length or heat treatment under such circumstances, depending upon the amount of reduction of atmospheric pressure prevailing.

The oil secured for example by heating the resin at 600 degrees F. for one hour under ordinary atmospheric pressure through thinning with a mixture of equal parts of benzol and benzin after the heat treatment, makes a paint oil or vehicle which may be used as a basis for pigments and colors of all description and in itself yields a paint oil of surprising durability. Such a product mixed with say soya bean oil in the proportion of two parts of the resin solution to one part of the oil and the addition of a small amount of Japan drier, yields a very useful paint oil, and as stated, other drying oils may be used if desired, wood oil however, being open to the objection that it tends to oxidize more or less in such solutions, when standing in containers, especially partly filled barrels, etc., and gelatinization brought about by such changes, makes it not as useful as certain of the other oils mentioned, which are free from this objection, as for example linseed oil and fish oil.

In applying this composition to concrete, for which purpose it serves as an excellent paint on account of its substantial unsaponifiability, I prefer to not introduce any drying oil, but use the simple solution of run resin. There is no objection however, to the employment of pigment ground in a drying oil, as the small percentage of saponifiable oil introduced in this manner is not detrimental, because when applied to the concrete this oil is so largely surrounded and embedded, as it were, in unsaponifiable material, that the alkalis of cement do not affect it in the usual way. When a flatting effect is desired on the concrete work for example, the addition to the oil of the aluminum soap of Chinese wood oil, containing aluminum eleomargarate, may be used to advantage in an amount of 5% or 10%, and if desired, 2% or 3%, for example of ceresin wax may be introduced.

The resin run at 600 degrees, F. more or less, as above described, may be mixed with a quantity of the raw resin and a solution made of this which affords an excellent waterproofing medium for porous stone, brick and concrete, and is usually of lighter color than the solutions run of resin alone. Furthermore the presence of the run resin seems to lend stability to the raw resin in solution rendering the latter less liable to separate when exposed to low temperatures. For such waterproofing applications, a solution of raw resin, one part in two parts of benzol may be mixed with a solution of equal parts of the run benzol and resin. Three volumes of the raw resin solution to one volume of the raw resin solution is a very satisfactory proportion. Or the composition may be made by heating 125 lbs. jelutong resin for one hour at 610 degrees F., adding 200 lbs. more resin and when this is melted, 75 gal. to 100 gal. of benzol, or a mixture of benzol and benzin are introduced.

I do not lay claim in this application to the process of using such unsaponifiable oil in the coating of concrete, which matter is set forth in my co-pending application, Serial No. 588,549. Nor do I lay claim herein to the various applications of Pontianak and guayule resins, set forth in my co-pending application, Serial No. 552,178 except as same may relate to the herein described product.

Reference is also made to Serial No. 628,577 as regards divisional matter derived from Serial No. 588,549, which matter is not claimed herein.

Having described my invention, to the details of which I do not wish to be limited, what I claim is—

1. A composition of matter comprising rubber resin heated to at least 500 degrees F.

2. A composition of matter comprising jelutong rubber resin, heated above 500 degrees F.

3. A composition of matter comprising Pontianak rubber resin heated above 500 degrees F.

4. A composition of matter comprising Pontianak rubber resin heated between 500 degrees and 650 degrees, F.

5. A composition of matter comprising Pontianak rubber resin heated between 500 degrees and 600 degrees F. with a loss of about 20% in weight.

6. A composition of matter comprising Pontianak rubber resin heated between 500 degrees and 650 degrees F. for about one hour, in a solution of a volatile hydrocarbon solvent.

7. A paint oil comprising the solution in a volatile solvent of jelutong rubber resin run at from 500 degrees to 650 degrees F.

8. A paint oil consisting of heat treated Pontianak rubber resin in a volatile hydrocarbon solvent, the concentration of the rubber resin exceeding 25%.

9. A paint oil comprising a solution of heat treated Pontianak rubber resin in a mixture of about equal parts of benzol and benzin, the concentration of said resin being approximately 50%.

10. A paint oil for priming and coating concrete, comprising heat-changed jelutong rubber resin in a suitable solvent.

11. A paint oil for priming and coating concrete comprising heat-changed jelutong rubber resin in a substantially volatile hydrocarbon solvent.

12. A paint oil for priming and coating concrete comprising heat-changed substantially unsaponifiable resin and a volatile thinner.

13. A paint oil for priming and coating concrete comprising heat treated rubber resin and untreated rubber resin in solution in a volatile thinner.

14. A paint oil for priming and coating concrete containing heat treated rubber resin and untreated rubber resin in solution in a volatile hydrocarbon thinner.

15. A paint oil for priming and coating concrete comprising jelutong rubber resin, substantially freed by heat treatment from rubber-like impurities.

Signed at Montclair in the county of Essex and State of New Jersey this 10th day of February A. D. 1911.

CARLETON ELLIS.

Witnesses:
NATHANIEL L. FOSTER,
B. M. ELLIS.